(12) United States Patent
Roehr et al.

(10) Patent No.: US 9,822,736 B2
(45) Date of Patent: Nov. 21, 2017

(54) SELF-PROPELLED CONSTRUCTION DEVICE, IN PARTICULAR A SOIL COMPACTOR

(75) Inventors: Andreas Roehr, Weiden (DE); Thomas Bletscher, Marktredwitz (DE); Michael Zimmerer, Immenreuth (DE)

(73) Assignee: HAMM AG, Tirschenreuth (DE)

( * ) Notice: Subject to any disclaimer, the term of this patent is extended or adjusted under 35 U.S.C. 154(b) by 1132 days.

(21) Appl. No.: 13/983,128

(22) PCT Filed: Mar. 7, 2012

(86) PCT No.: PCT/EP2012/053874
§ 371 (c)(1),
(2), (4) Date: Aug. 1, 2013

(87) PCT Pub. No.: WO2012/120028
PCT Pub. Date: Sep. 13, 2012

(65) Prior Publication Data
US 2013/0305717 A1 Nov. 21, 2013

(30) Foreign Application Priority Data
Mar. 9, 2011 (DE) .................. 10 2011 005 275

(51) Int. Cl.
*F02B 29/04* (2006.01)
*F02M 25/07* (2006.01)
(Continued)

(52) U.S. Cl.
CPC ......... *F02M 25/0715* (2013.01); *E01C 19/26* (2013.01); *E01C 19/282* (2013.01);
(Continued)

(58) Field of Classification Search
CPC .. B60K 11/04; B60K 11/06; F01P 5/02; F01P 2003/182; F01P 2005/025; F01P 2060/02; F02B 29/0456; F02B 29/0475
See application file for complete search history.

(56) References Cited

U.S. PATENT DOCUMENTS 4,007,819 A   2/1977   Maci
4,090,596 A   5/1978   Blair
(Continued)

FOREIGN PATENT DOCUMENTS

CN   2931188 Y   8/2007
CN   101010497 A   8/2007
(Continued)

OTHER PUBLICATIONS

Second Office Action issued for Chinese patent appficetion No. 201280012138.2 dated Jun. 11, 2015 (6 pages).
(Continued)

*Primary Examiner* — Jonathan Matthias
(74) *Attorney, Agent, or Firm* — Rothwell, Figg, Ernst & Manbeck, P.C.

(57) ABSTRACT

A self-propelled construction device, in particular a soil compactor, includes a turbocharged diesel engine with a first radiator arrangement for cooling charge air and a second radiator arrangement for cooling a cooling liquid and/or hydraulic oil, with a first radiator fan being allocated to the first radiator arrangement and a second radiator fan being allocated to the second radiator arrangement and the first radiator fan and the second radiator fan being able to be operated essentially independently from each other.

11 Claims, 2 Drawing Sheets

Figure 1:
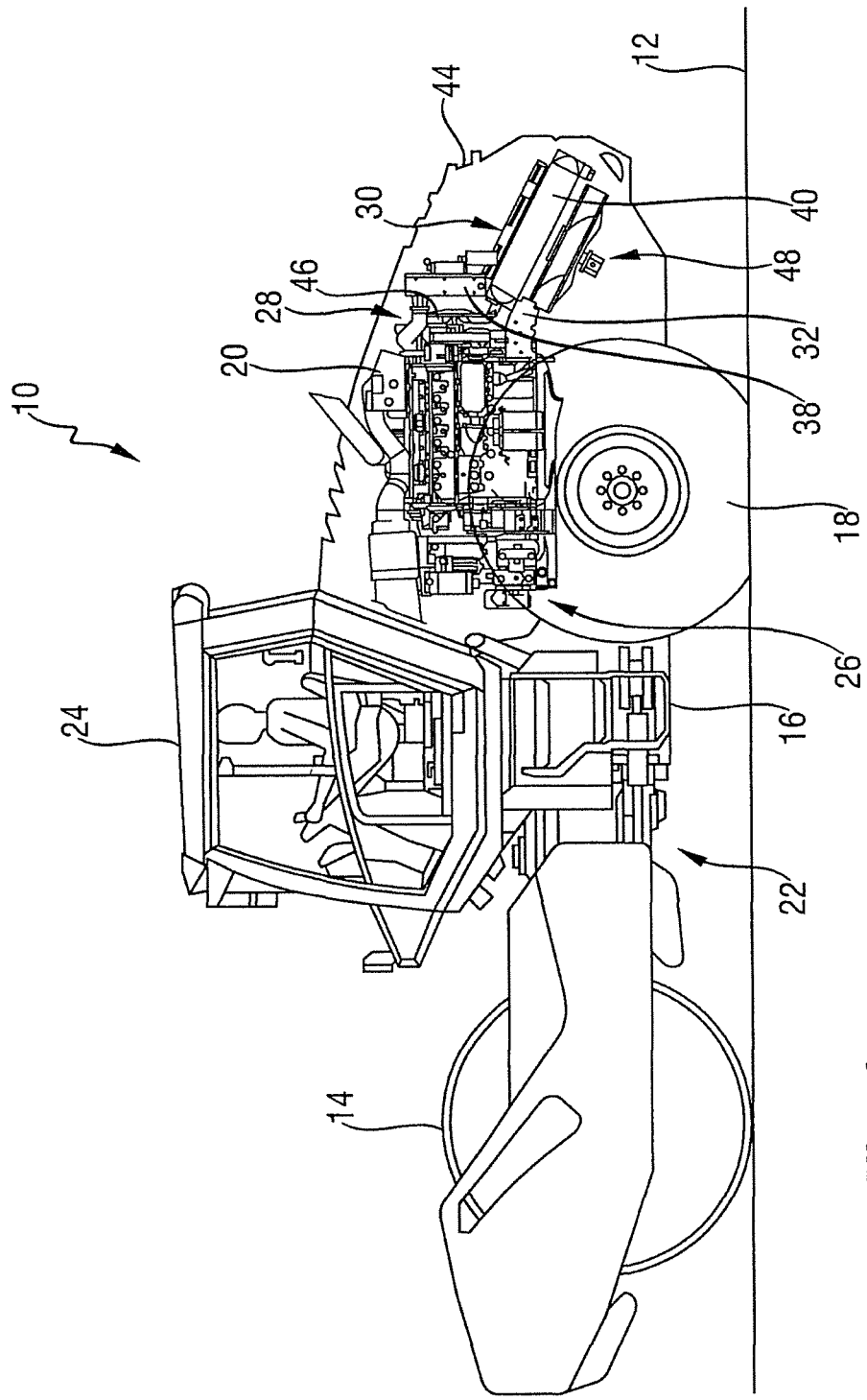

(51) Int. Cl.

| | |
|---|---|
| *E02D 3/026* | (2006.01) |
| *E02D 3/032* | (2006.01) |
| *E02D 3/046* | (2006.01) |
| *E02D 3/02* | (2006.01) |
| *F01P 5/02* | (2006.01) |
| *E01C 19/26* | (2006.01) |
| *E01C 19/28* | (2006.01) |
| *F02M 26/13* | (2016.01) |
| *F01P 3/18* | (2006.01) |

(52) U.S. Cl.
CPC ............... *E02D 3/02* (2013.01); *E02D 3/026* (2013.01); *E02D 3/032* (2013.01); *E02D 3/046* (2013.01); *F01P 5/02* (2013.01); *F02B 29/0456* (2013.01); *F02B 29/0475* (2013.01); *F02M 26/13* (2016.02); *F01P 2003/182* (2013.01); *F01P 2005/025* (2013.01); *F01P 2060/02* (2013.01); *Y02T 10/146* (2013.01)

(56) References Cited

U.S. PATENT DOCUMENTS

| | | | |
|---|---|---|---|
| 4,186,693 | A * | 2/1980 | Thien ........................ F01P 5/04 123/41.12 |
| 6,318,347 | B1 | 11/2001 | Dicke et al. |
| 6,758,266 | B1 | 7/2004 | Sjunnesson et al. |
| 7,134,518 | B2 | 11/2006 | Arai et al. |
| 7,210,522 | B2 | 5/2007 | Gruian |
| 2001/0029907 | A1 | 10/2001 | Algrain et al. |
| 2005/0006048 | A1 | 1/2005 | Vuk |
| 2005/0117970 | A1 | 6/2005 | Gaertner et al. |
| 2006/0277906 | A1 | 12/2006 | Burk et al. |
| 2007/0051326 | A1 | 3/2007 | Bering |
| 2007/0144463 | A1 | 6/2007 | Keane et al. |
| 2008/0098998 | A1 | 5/2008 | Dicke |
| 2009/0139474 | A1 | 6/2009 | Mokire |
| 2009/0217655 | A1 | 9/2009 | Yabuki |
| 2010/0263369 | A1 | 10/2010 | Kardos et al. |
| 2012/0020811 | A1 | 1/2012 | Kraeutler et al. |

FOREIGN PATENT DOCUMENTS

| | | |
|---|---|---|
| CN | 201475020 U | 5/2010 |
| CN | 101892894 A | 11/2010 |
| DE | 26 23 570 A1 | 6/1977 |
| DE | 27 59 015 A1 | 7/1978 |
| DE | 3320754 A1 | 2/1984 |
| DE | 3931699 A1 | 2/1991 |
| DE | 43 21 636 A1 | 1/1995 |
| DE | 43 21 637 A1 | 1/1995 |
| DE | 44 14 979 A1 | 11/1995 |
| DE | 100 62 534 A1 | 7/2001 |
| DE | 101 28 417 A1 | 4/2002 |
| DE | 103 47 872 B3 | 4/2005 |
| DE | 10 2006 024 315 A1 | 4/2007 |
| DE | 20 2009 017 010 U1 | 4/2010 |
| EP | 1 496 214 A1 | 1/2005 |
| EP | 2 410 150 A1 | 1/2012 |
| GB | 2 045 183 A | 10/1980 |
| JP | H08-277713 A | 10/1996 |
| JP | H10-259724 A | 9/1998 |
| JP | H11-241367 A | 9/1999 |
| WO | 2009151377 A1 | 12/2009 |
| WO | 2009151378 A1 | 12/2009 |

OTHER PUBLICATIONS

Office Action issued for Chinese patent application No. 201280012138.2 dated Nov. 3, 2014 (5 pages).
German Patent Application No. 10 2011 005 275.5, Search Report dated Dec. 28, 2011 (5 pages).
International Patent Application No. PCT/EP2012/053874, International Search Report dated Mar. 11, 2013 (2 pages).
Textbook "Baumaschinen Erbau—and Tagebaumaschinen", stating that, normally, diesel engines are used for driving construction machines. (3 pages).

* cited by examiner

SELF-PROPELLED CONSTRUCTION DEVICE, IN PARTICULAR A SOIL COMPACTOR

RELATED APPLICATIONS

The present application is a national phase of PCT/EP2012/053874, filed Mar. 7, 2012, which claims the benefit of priority to German Patent Application No. 10 2011 005 275.5, filed Mar. 9, 2011, each of which is incorporated herein by reference in its entirety.

The present invention relates to a self-propelled construction device, for example embodied as a soil compactor.

Such construction device is used for example in road construction to compact an underground to be covered with concrete, asphalt, or the like. For this purpose, the soil compactors move with at least one roll, provided thereat and optionally impinged with vibrations, over the foundation material to be compacted. The drive energy for the vehicle drive, on the one hand, and the shaking and/or vibration drive, on the other hand, is generally provided by a turbocharged diesel engine. In order to cool the air compressed by a turbocharger and to be introduced into the combustion chamber generally a radiator arrangement, also called air intercooler, is allocated to such a drive engine. Further, a radiator arrangement is provided, by which the engine coolant and/or the hydraulic oil, required for the hydraulic operation of various system areas and/or the drive operation, can be cooled.

The objective of the present invention is to provide a self-propelled construction device, in particular a soil compactor, which allows a compact design and a fuel-saving operation.

According to the invention this objective is attained in a self-propelled construction device, in particular a soil compactor, comprising a turbocharged diesel engine with a first radiator arrangement for cooling charge air and a second radiator arrangement for cooling coolant and/or hydraulic oil, with the first radiator arrangement being allocated to a first radiator fan and the second radiator arrangement being allocated to a second radiator fan, and the first radiator fan and the second radiator fan being able to be operated essentially independently from each other.

In the construction device designed according to the invention the two radiator arrangements are allocated to radiator fans, independent from each other, thus allowing one to actually operate the different radiator fans only when necessary and with the required capacity when cooling must be provided. In particular it is possible thereby to waive the operation of the second radiator fan, when the coolant and/or the hydraulic oil to be cooled thereby, due to relatively low ambient temperatures or a starting phase of the operation, actually require no cooling, while simultaneously the air to be introduced into the diesel engine for combustion must be cooled after compression by the turbocharger.

Due to the fact that in general the first radiator fan must always be operating when the diesel engine is in operation, it is suggested that the first radiator fan can be driven by a secondary power take-off of the diesel engine.

Here, an ability for adjusting the flow rate of the first radiator fan can be achieved such that a clutch arrangement, particularly a visco-clutch, is allocated thereto. This way it is possible to vary the energy taken off at the secondary power take-off of the diesel engine according to the cooling capacity required by the first radiator arrangement.

A fan drive unit may be allocated to the second radiator fan, so that it can also be operated independent from the operation of the drive engine. This fan drive unit may for example include a hydraulic engine, thus operated by the energy included and/or stored in a hydraulic circuit.

A very space-saving positioning of the first radiator arrangement can be achieved such that it is arranged oriented essentially vertically in reference to an essentially horizontal flow of cooling air.

Further, it may be provided that the second radiator arrangement is provided in an inclined fashion in reference to a vertical line and during the cooling operation the cooling air can flow through it from the bottom towards the top. When here it is particularly provided that the second radiator arrangement extends, starting from the area in the proximity of the first radiator arrangement, in a direction away from the diesel engine and downwards, it is possible to integrate the diesel engine with the two radiator arrangements in an exterior contour, which provides the operating personnel with a good overview from the helm to the underground in the surrounding of the construction device.

This is particularly advantageous when the first radiator arrangement and the second radiator arrangement are provided at a secondary energy take-off side of the diesel engine.

The two radiator arrangements must be coupled to the diesel engine by different connection lines in order to allow the medium to be cooled flowing through it, i.e. the charge air and/or the cooling liquid and/or the hydraulic oil. By the oscillations and/or vibrations developing during operation, such connection lines are subjected to major stress. When it is further provided that the first radiator arrangement and the second radiator arrangement are fastened at the diesel engine combined to a pre-assembly, it can be ensured that relative motions generated by oscillations or vibrations can largely be avoided between the radiator arrangements and the diesel engine, which leads to a considerable reduction of the stress of such connection lines.

Independent from the aspect of providing separate radiator fans for the two radiator arrangements, this aspect of the invention, to provide a pre-assembly, can also be used particularly advantageously when this pre-assembly further comprises:

an air-conditioning condenser, and/or
an exhaust gas processing unit, preferably an exhaust particle filter and/or catalytic converter, and/or
the second radiator fan.

The diesel engine can furthermore be fastened at the construction device together with the pre-assembly fastened as a structural unit. This is not only advantageous when executing maintenance work, but supports the release of the assemblies fastened at the diesel engine within the scope of the pre-assembly.

Figure 2:
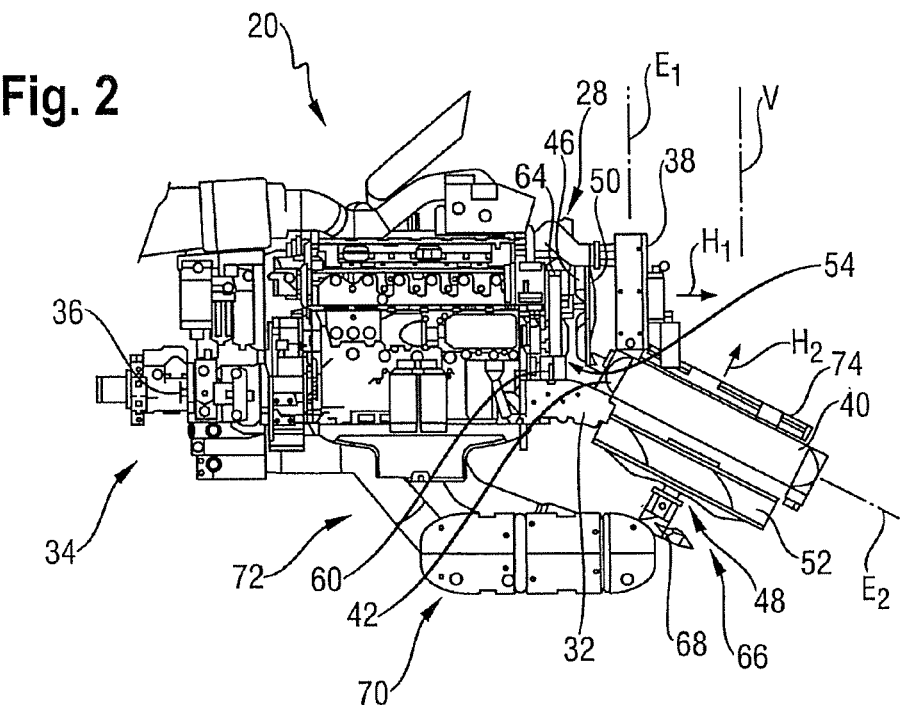

In the following the present invention is described in greater detail with reference to the attached figures. It shows:

FIG. 1 a side view of a self-propelled construction device embodied as a soil compactor;

FIG. 2 a side view of a drive engine and radiator arrangements allocated thereto of the construction device shown in FIG. 1

Figure 3:
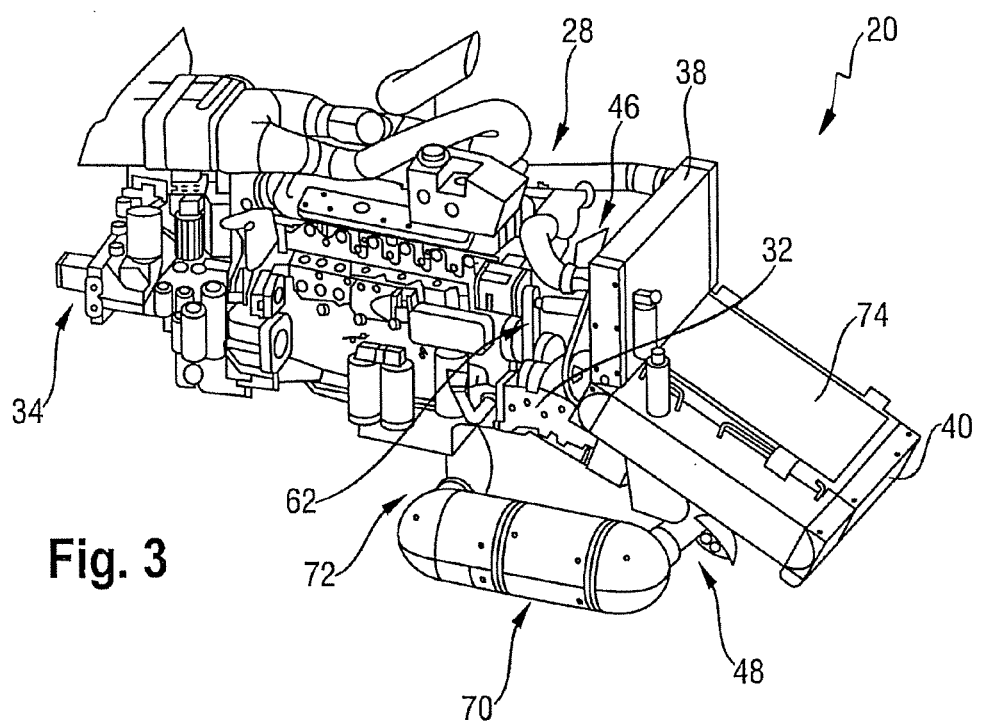

FIG. 3 a perspective view of the drive engine and the radiator arrangements.

In FIG. 1 a soil compactor 10 is shown as an example of a self-propelled construction device. In order to compact the foundation material of the underground 12 the soil compactor 10 comprises a compacting roll 14, which is allocated to a vibration and/or shaking drive not shown in FIG. 1. This essentially hydraulically operated drive can be provided in the compacting roll 14.

For the propelling of the soil compactor 10 drive wheels 18 are provided at a linked frame 16 thereof. The energy required for the driving and also for the vibration and/or shaking operation is provided by a turbocharged diesel engine 20. This is approximately fastened at the frame 16 of the soil compactor 16 in an area located above the driving wheels 18. In an area between the driving wheels 18 and/or the diesel engine 20 and the compacting roll 14, an operator cabin 24 is arranged approximately above the link 22 of the frame 16 provided for the person operating the soil compactor 10.

By the diesel engine 20 a hydraulic drive unit 26 is driven, only its principle [operation] being shown in FIG. 1, which can generate with a hydraulic pump the hydraulic pressure required for operating various system areas and with a hydraulic engine providing the torque required for the driving wheels 18.

A pre-assembly is provided, generally marked 30, at the side of the diesel engine 20 at the secondary energy take-off 28 facing away from the operator cabin 24, which for example may comprise a pre-assembly frame 32 and is fastened together with it directly at the diesel engine 20. In the following the design of this pre-assembly 30 and/or the assemblies included therein are explained in greater detail with reference to FIGS. 2 and 3.

In FIGS. 2 and 3 the primary drive side 34 of the diesel engine 20 is shown, at which via a primary drive shaft and/or a crankshaft 36 a hydraulic pump or perhaps several hydraulic pumps are driven by the above-discussed hydraulic drive unit 26. Two radiator arrangements 38, 40 are located at the secondary energy take-off 28. The first radiator arrangement 38 serves for cooling the combustion air to be introduced into the combustion chamber of the diesel engine 20 and to be compacted by the turbocharger and is generally also called air intercooler. The second radiator arrangement 40 serves to cool a coolant circulating, among other things, in the water coat of the diesel engine 20. Alternatively or additionally the second radiator arrangement 40 can be used to cool the hydraulic oil circulating in a hydraulic circuit.

The first radiator arrangement 38 is positioned here essentially such that a radiator level $E_1$ is essentially arranged vertically, thus positioned essentially parallel in reference to a vertical line V. The radiator level $E_1$ is essentially in a level which is positioned orthogonally in reference to the primary direction of flow $H_1$ of the cooling air flowing through the radiator arrangement 38. In the vertical direction underneath the first radiator arrangement 38 the second radiator arrangement 40 is provided such that it is aligned essentially in a level $E_2$, which extends diagonally and/or tilted in reference to the vertical line V such that the primary direction of flow $H_2$ of the air conveyed through the second radiator arrangement 40 is aligned diagonally from the bottom to the top and in the direction away from the secondary energy take-off 28. This way an arrangement results, in which the second radiator arrangement 40 extends, starting from its section 42 located in the proximity underneath the first radiator arrangement 38 and the side of the secondary energy take-off 28, diagonally downwards and away from the side of the secondary take-off 28 such that an angle of more than 90° is formed between the two levels $E_1$ and $E_2$.

This spatial relationship, also clearly discernible in FIG. 3, between the two radiator arrangements 38, 40 leads to the diesel engine 20 with the two radiator arrangements 38, 40 combined in the pre-assembly 30 being able to be positioned at the side of the secondary energy take-off 28 of the diesel engine such that a cover 44 of the soil compactor 10, discernible in FIG. 1, can be contoured downwards in this area. This allows the person operating the soil compactor in the operator cabin 24 a good overview over the area of the underground 12 located at the right behind the soil compactor 10 in FIG. 1.

Radiator fans 46, 48 are allocated to the two radiator arrangements 38, 40, which are separate and generally can also be operated independently from each other. Each of the radiator fans 46, 48 comprises a conveyer wheel 50 and/or 52, for example, respectively showing a plurality of fan blades. A rotary axis of the conveyer wheel 50 of the first radiator fan 46 for the first radiator arrangement 38 is essentially arranged horizontally, thus is positioned essentially orthogonally in reference to the level $E_1$ defining the orientation of the first radiator arrangement 38 and essentially in the primary direction of flow $H_1$. Accordingly a rotary axis of the conveyer wheel 52 of the second radiator fan 48 of the radiator arrangement 40 is essentially oriented orthogonally to the level $E_2$ and is located essentially in the direction of the primary direction of flow $H_2$.

The conveyer wheel 50 of the first radiator fan 46 can be driven rotationally by a secondary energy take-off of the diesel engine 20, generally marked 54. This secondary energy take-off 54 may for example comprise a pulley 60, [connected] in a torque-proof fashion to a primary driven shaft, for example a crankshaft, of the diesel engine 20, which via a driven belt 62 causes the pulley 64 carrying a conveyer wheel 50 to rotate when the diesel engine 20 is operating. In order to here allow adjusting the rotation of the conveyer wheel 50 and thus its conveying capacity for example a clutch, such as a visco-clutch, may be integrated in the pulley 64, which is addressed by a control device and thus its torque transmission behavior can be influenced.

By connecting the conveyer wheel 50 of the first radiator fan 46 to the diesel engine 20 it is ensured that when the diesel engine 20 is operating the first radiator fan 46 is always also in operation and thus the first radiator arrangement 38 to cool the air compacted in a turbocharger is effective.

A separate fan drive unit 66 is allocated to the conveyer wheel 52 of the second radiator fan 48. This may include for example a hydraulic engine 68, which is fed from the hydraulic system of the soil compactor 10 and for example can be activated by a respective control of a valve arrangement or a hydraulic pump. Depending on the activation of the hydraulic engine 68, the rotation of the conveyer wheel 52 of the second radiator fan 48 and thus its flow rate and the cooling effect of the second radiator arrangement 40 can be adjusted. The hydraulic engine 68 may also be generally operated when, by the operation of the diesel engine 20, a respective hydraulic pressure is provided or sufficient energy is stored in a hydraulic pressure reservoir in order to provide the required operating pressure to run the hydraulic engine 68. In an alternative embodiment which in general is independent from the operation of the diesel engine 20, the fan drive unit 66 may, as an alternative to the hydraulic engine 68, also comprise an electric engine which is then fed by a battery provided at the construction device.

Due to the fact that the two radiator fans 46, 48 comprise on the one hand separate conveyer wheels 50, 52 and on the other hand these conveyer wheels 50, 52 can be made to rotate by separate drives, it is possible to adjust the cooling effect of the two radiator arrangements independently from each other. This allows for example the waiving of an operation of the second radiator fan 48 when due to given temperatures it is not necessary, while simultaneously the first radiator arrangement 38 is active when the drive engine 20 is in operation, in order to cool the charge air. This leads to the different radiator fans 46, 48 actually being subjected to load only when that is required, and this leads to energy savings by waiving the operation of at least the second radiator fan 48 when it is actually not required. This way it is also possible on the one hand to optimally design the two radiator arrangements 38, 40 with regard to the type of media to be cooled and on the other hand the respectively given media flows. In particular by dividing [the load] into two separate radiator arrangements 38, 40 each of them can be sized smaller than otherwise necessary in the case of one radiator arrangement used for both aspects, which in turn simplifies the integration in the cover 44 of the soil compactor 10.

In order to provide a defined flow guide for the two radiator arrangements 38, 40 a guide element, for example a guide sheet, may be provided between them, not shown in the figures, which can also contribute to compensate pressure differences between the two radiator arrangements 38, 40.

As already discussed, the two radiator arrangements 38, 40 are directly arranged at the diesel engine 20, combined to a pre-assembly 30. This also simplifies the flow guidance of the media to be cooled, because the hoses leading away from and/or towards the diesel engine 20 are not required to perform any relative motion between the diesel engine 20 on the one hand and the radiator arrangements 38, 40 on the other hand for the purpose of compensation. For this purpose it is further advantageous when the second radiator fan 48 is also provided at this pre-assembly 30, as illustrated in FIG. 1. The first radiator fan 46 is not included in the pre-assembly 30, because it is only provided and/or mounted at the secondary energy take-off side 28 of the diesel engine 20. The first radiator fan 46 is therefore installed prior to the fastening of the pre-assembly 30 at the diesel engine 20.

Another assembly provided advantageously at the pre-assembly 30 is an exhaust gas treatment unit 70, e.g., a particle filter and/or a catalytic converter, for the exhaust guiding system 72 of the diesel engine 20. Here it is also advantageous that the exhaust pipe leading away from the diesel engine 20 must be connected to an assembly, namely the exhaust gas treatment unit 70, and here by way of integration thereof in the pre-assembly 30 and by fastening of the pre-assembly 30 at the diesel engine 20 it essentially performs no relative motion with regard to the diesel engine 20.

An air-conditioning condenser 74 may form another component of the pre-assembly 30, which can be fastened at the radiator arrangement 40 at the side facing away from the second radiator fan 48 and thus air conveyed by the second radiator fan 48 can flow around it. Further it is possible in the pre-assembly 30 to provide a diesel radiator for the diesel fuel to be introduced into the internal combustion chamber of the diesel engine 20.

The diesel engine 20 connected to this pre-assembly can be fastened as a whole at the frame 16 of the soil compactor 10 and in this entirety also be removed for performing maintenance tasks. This aspect of combining various assemblies, particularly the two radiator arrangements 38, 40 to form a pre-assembly 30, is particularly advantageous and can also be used when for example the two radiator arrangements 38, 40 are allocated to radiator fans which are not separate and/or can be operated separately. A spatial allocation of the two radiator arrangements while upholding the advantageous aspects resulting from the provision of the pre-assembly may be embodied as shown in the figures. In general, with regard to this aspect, of course a different spatial allocation of the two radiator arrangements 38, 40 may also be selected.

The invention claimed is:

1. A self-propelled construction device comprising:
a turbocharged diesel engine with a first radiator arrangement to cool charge air and a second radiator arrangement to cool coolant and/or hydraulic oil, with a first radiator fan being allocated to the first radiator arrangement and a second radiator fan being allocated to the second radiator arrangement and the first radiator fan and the second radiator fan being able to be operated independently from each other;
wherein the first radiator arrangement and the second radiator arrangement are arranged at a secondary energy take-off side of the diesel engine;
wherein the first radiator arrangement is arranged such that a radiator level thereof is oriented vertically for obtaining a horizontal flow of cooling air; and
wherein the second radiator arrangement, starting from its area near the first radiator arrangement, extends diagonally downward and in the direction away from the secondary energy take-off side of the diesel engine, such that a radiator level thereof extends diagonally in reference to a vertical line.

2. The self-propelled construction device according to claim 1, wherein the first radiator fan can be driven by a secondary energy take-off of the diesel engine.

3. The self-propelled construction device according to claim 2, wherein a clutch arrangement is allocated to the first radiator fan to adjust the flow rate.

4. The self-propelled construction device according to claim 3, wherein the clutch arrangement comprises a visco-clutch.

5. The self-propelled construction device according to claim 1, wherein a fan drive unit is allocated to the second radiator fan.

6. The self-propelled construction device according to claim 5, wherein the fan drive unit comprises a hydraulic engine.

7. The self-propelled construction device according to claim 1, wherein the second radiator arrangement is inclined in reference to a vertical line and cooling air can flow through it in the cooling mode from the bottom to the top.

8. The self-propelled construction device according to claim 1, wherein the second radiator arrangement is provided in the vertical direction underneath the first radiator arrangement.

9. The self-propelled construction device according to claim 1, wherein the first radiator arrangement and the second radiator arrangement are combined to a preassembly, fixed at the diesel engine.

10. The self-propelled construction device according to claim 9, wherein the preassembly further comprises one or more of:
an air-conditioning condenser;
an exhaust gas treatment unit; and
the second radiator fan.

11. The self-propelled construction device according to claim 9, wherein the diesel engine is fixed with the pre-assembly fastened thereat as one unit at a construction device frame.

* * * * *